United States Patent
Morioka et al.

(10) Patent No.: US 8,199,910 B2
(45) Date of Patent: Jun. 12, 2012

(54) SIGNATURE GENERATION APPARATUS AND SIGNATURE VERIFICATION APPARATUS

(75) Inventors: Sumio Morioka, Tokyo (JP); Toshinori Araki, Tokyo (JP)

(73) Assignee: NEC Corporation, Tokyo (JP)

(*) Notice: Subject to any disclaimer, the term of this patent is extended or adjusted under 35 U.S.C. 154(b) by 381 days.

(21) Appl. No.: 12/458,068

(22) Filed: Jun. 30, 2009

(65) Prior Publication Data

US 2009/0296923 A1 Dec. 3, 2009

(30) Foreign Application Priority Data

Jul. 2, 2008 (JP) ................................. 2008-173993

(51) Int. Cl.
*H04L 9/00* (2006.01)

(52) U.S. Cl. ............... 380/28; 380/29; 380/30; 380/44; 380/45; 380/47

(58) Field of Classification Search ............... 380/1–287
See application file for complete search history.

(56) References Cited

U.S. PATENT DOCUMENTS

| | | | | |
|---|---|---|---|---|
| 4,567,600 A | * | 1/1986 | Massey et al. ............... | 713/174 |
| 6,876,745 B1 | * | 4/2005 | Kurumatani .................. | 380/28 |
| 2001/0003834 A1 | * | 6/2001 | Shimonishi .................. | 709/310 |
| 2008/0040700 A1 | | 2/2008 | Katoh et al. | |
| 2009/0276630 A1 | * | 11/2009 | Teranishi ..................... | 713/176 |
| 2009/0296923 A1 | * | 12/2009 | Morioka et al. ................ | 380/28 |

FOREIGN PATENT DOCUMENTS

| | | |
|---|---|---|
| JP | 2007-272671 | 10/2007 |
| WO | WO 2007105749 A1 * | 9/2007 |

OTHER PUBLICATIONS

Isamu Teranishi, "A New Group Signature Scheme Secure Under Improved Definitions with a Fix to Pervious Schemes", IEICE, ISEC 2004, 2005 and partial English translation thereof.

Toshinori Araki, et al., "FPGA Implementation of a group signature scheme", The 2008 Symposium on Cryptography and Information Security, 2008 and partial English translation thereof.

Overview Multi-Layer AHB, Copyright ARM Limited 2001, 2004., ARM DVI 0045B, pp. 1-8.

Isamu Teranishi, "A New Group Signature Scheme Secure Under Improved Definitions with a Fix to Previous Schemes", The Institute of Electronics, Information and Communciation Engineers, Techncial Report of IEICE, ISEC 2004, 2005), pp. 1-6.

* cited by examiner

*Primary Examiner* — Longbit Chai

(74) *Attorney, Agent, or Firm* — McGinn IP Law Group, PLLC

(57) ABSTRACT

A signature generation apparatus generates a signature for a message m from the i-th user, and computes any two or three of $a[1]^{\mu[x]}$ (mod n), $a[2]^{\mu[s]}$ (mod n), and $w^{\mu[r]}$ (mod l) are in parallel. For this reason, the signature generation apparatus is provided with a plurality of fast arithmetic units (sub-IPs) within the IP core. The individual sub-IPs are connected to each other via a narrow-band, single-layer local bus.

8 Claims, 8 Drawing Sheets

FIG.1

| Sub-IP operation | Bit length | CLK cycles | Times | Ratio |
|---|---|---|---|---|
| EC Scalar Multiplication | 160 | 740,131 | 7 | 15.9% |
| EC Point Addition | 160 | 3,441 | 4 | <0.1% |
| Modular Multiplication | 1024 x 1024 | 2,771 | 5 | <0.1% |
| Modular Exponentiation | $(1024)^{280}$ | 1,476,441 | 2 | 9.0% |
| Modular Exponentiation | $(1024)^{512}$ | 2,696,661 | 2 | 16.5% |
| Modular Exponentiation | $(1024)^{792}$ | 4,170,281 | 1 | 12.8% |
| Modular Exponentiation | $(1024)^{1236}$ | 6,505,921 | 1 | 19.9% |
| Modular Exponentiation | $(1024)^{1464}$ | 7,705,661 | 1 | 23.6% |
| Modulo Mult Inv. | 1024 | 930,956 | 2 | 5.7% |
| INT Multiplication | 160 x 60 | 266 | 1 | <0.1% |
| INT Multiplication | 160 x 160 | 326 | 1 | <0.1% |
| INT Multiplication | 160 x 576 | 646 | 1 | <0.1% |
| INT Multiplication | 160 x 1016 | 996 | 1 | <0.1% |
| INT Multiplication | 160 x 1244 | 1,176 | 1 | <0.1% |
| INT Multiplication | 512 x 50 | 406 | 1 | <0.1% |
| INT Multiplication | 512 x 504 | 1,296 | 1 | <0.1% |
| INT Modulo | 321 % 160 | 3,466 | 1 | <0.1% |
| INT Modulo | 1464 % 160 | 27,346 | 1 | <0.1% |
| SHA-1 | (message len) | (<10,000) | 1 | <0.1% |
| Random number gen | 160 | 853 | 2 | <0.1% |
| Random number gen | 280 | 991 | 1 | <0.1% |
| Random number gen | 512 | 1,261 | 2 | <0.1% |
| Random number gen | 792 | 1,391 | 1 | <0.1% |
| Random number gen | 1236 | 1,811 | 1 | <0.1% |
| Random number gen | 1464 | 2,081 | 1 | <0.1% |
| Data transfer & control | -- | 1,286,806 | -- | 3.8% |
| TOTAL(sequential exec.) | -- | 33,909,915 | -- | (100%) |

FIG.2

| Sub-IP operation | Bit length | CLK cycles | Times | Ratio |
|---|---|---|---|---|
| EC Scalar Multiplication | 160 | 740,131 | 7 | 16.0% |
| EC Point Addition | 160 | 3,441 | 5 | <0.1% |
| EC Point Negation | 160 | 71 | 3 | <0.1% |
| Modular Multiplication | 1024 x 1024 | 2,771 | 5 | <0.1% |
| Modular Exponentiation | $(1024)^{160}$ | 844,741 | 2 | 5.2% |
| Modular Exponentiation | $(1024)^{280}$ | 1,476,441 | 1 | 4.5% |
| Modular Exponentiation | $(1024)^{665}$ | 3,507,241 | 1 | 10.8% |
| Modular Exponentiation | $(1024)^{793}$ | 4,180,751 | 1 | 12.9% |
| Modular Exponentiation | $(1024)^{1237}$ | 6,516,391 | 1 | 20.1% |
| Modular Exponentiation | $(1024)^{1465}$ | 7,716,137 | 1 | 23.8% |
| Modulo Mult Inv. | 1024 | 930,956 | 2 | 5.8% |
| INT Modulo | 1465 % 160 | 27,206 | 1 | <0.1% |
| SHA-1 | 672 | 260 | 1 | <0.1% |
| Data transfer & control | -- | 1,001,399 | -- | 3.2% |
| TOTAL(sequential) | -- | 31,894,240 | -- | (100%) |

SIGNATURE GENERATION APPARATUS AND SIGNATURE VERIFICATION APPARATUS

This application is based on Japanese Patent Application No. 2008-173993 filed on Jul. 2, 2008, and including specification, claims, drawings and summary. The disclosure of the above Japanese Patent Application is incorporated herein by reference in its entirety.

TECHNICAL FIELD

The present invention relates to a signature generating apparatus and a signature verification apparatus whereby an electronic circuit for accelerating group signature generation and verification is realized, while also curtailing manufacturing costs.

BACKGROUND ART

In recent years, group signature technology has been proposed in the fields of cryptography and signature studies.

Meanwhile, other technology has been proposed for the design of electronic circuits specializing in specific calculations, wherein the circuit behavior is specified in a high-level language such as c, and then behavioral synthesis is conducted to output a configuration of the electronic circuit. In other words, due to advances in computer technology, it is becoming typical to design, analyze, and evaluate semiconductor integrated circuits by using CAD (computer-aided design) systems provided with a behavioral synthesizer and a logic synthesizer.

For example, a circuit design support system provided with a behavioral synthesizer and a logic synthesizer has been disclosed in Unexamined Japanese Application KOKAI Publication No. 2007-272671.

When designing a semiconductor integrated circuit with the use of a circuit design support system, the designer first prepares a behavioral level description, including input ports, bit-widths of variables, and other information used for H/W conversion.

Next, the designer uses a behavioral synthesizer to convert the behavioral level description into an RTL (register transfer level) description wherein the logic to be realized is expressed as logical functions between registers.

Subsequently, the designer uses a logic synthesizer to convert the RTL description into a gate level logic circuit.

In such a circuit design methodology, it is typical to make the electronic circuit layout multi-layered and increase the bandwidth for information exchange, thereby enabling faster operation (as disclosed in "Multi-layer AHB Overview", ARM DVI 0045B, ARM, 2001, 2004)

Meanwhile, a basic algorithm for generating and verifying group signatures has also been disclosed (see Isamu Teranishi, "A New Group Signature Scheme Secure Under Improved Definitions with a Fix to Previous Schemes", IEICE, ISEC 2004, 2005).

The group signature herein is subject to: a predetermined bit-length $K[n]$; a predetermined bit-length $K[l]$; a predetermined bit-length $K[e]$; a predetermined bit-length $K[e']$; a bit-length $K[q]$ of a prime number q denoting the order of a finite group GG defined by an elliptic curve; an output bit-length $K[c]$ returned by a hash function Hash applied to a bit sequence of arbitrary length; a bit-length $K[S]$ such that when a random number r of bit-length $|a|+K[S]$ for any integer a is selected, then a+r and a are statistically indistinguishable; security parameters $K=(K[n], K[l], K[e], K[e'], K[q], K[c], K[S])$; an integer $\lambda=K[n]+K[q]+K[S]$; a set of integer values $\Lambda$ in a range from 0 (inclusive) to $2^\lambda$ (exclusive); scalar multiplication $[c](\cdot)$ on the elliptic curve; point addition $+_e$ on the elliptic curve; and point subtraction $-_e$ on the elliptic curve.

The Issuer's key pair for the group signature is
ipk=(n, a[0], a[1], a[2]);
isk=(p[1], p[2])
where p[1] and p[2] are safe prime numbers of bit-length $K[n]/2$; $n=p[1]p[2]$; and a[0], a[1], and a[2] are elements of the cyclic subgroup QR(n) with respect to n.

In addition, the Opener's key pair for the group signature is
opk=(q, G, H[1], H[2]);
osk=(y[1], y[2])
where y[1] and y[2] are elements of the prime number q-modulo finite field Zq, G is an element of the finite group GG, $H[1]=[y[1]]G$, and $H[2]=[y[2]]G$.

Meanwhile, the User-Revocation manager's key pair for the group signature is
rpk=(l, b, w);
rsk=(l[1], l[2])
where l[1] and l[2] are safe prime numbers of bit-length $K[l]/2$; $l=l[1]l[2]$; and b and w are elements of the cyclic subgroup QR(l) with respect to l.

In addition, the i-th user's key pair for the group signature is
msk[i]=x[i];
mpk[i]=(h[i], A[i], e'[i], B[i])
where x[i] is an element of the set $\Lambda$; and A[i], B[i], e'[i], and h[i] satisfy $h[i]=[x[i]]G$, $B[i]=b^{1/e'[i]}$ (mod l), $e[i]=2^{K[e]+e'[i]}$, and $a[0]a[1]^{x[i]} \equiv A[i]^{e[i]}$ (mod n).

When generating a signature for a message m from the i-th user, the following are first chosen randomly: an element $\rho[E]$ of the finite field Zq, a bit sequence $\rho[m]$ of bit-length $K[n]/2$, a bit sequence $\rho[r]$ of bit-length $K[l]/2$, a bit sequence $\mu[x]$ of bit-length $\lambda+K[c]+K[S]$, a bit sequence $\mu[s]$ of bit-length $K[e]+K[n]/2+K[c]+K[S]$, a bit sequence $\mu[e']$ of bit-length $K[e']+K[c]+K[S]$, a bit sequence $\mu[t]$ of bit-length $K[e']+K[l]/2+K[c]+K[S]$, and an element $\mu[E]$ of the finite field Zq.

Next, $E[0]=[\rho[E]]G$, $E[1]=h[i]+_e[\rho[E]]H[1]$, $E[2]=h[i]+_e[\rho[E]]H[2]$, $E=(E[0], E[1], E[2])$, and $V[ComCipher]=([\mu[E]]G, [\mu[x]]G+_e[\mu[E]]H[1], [\mu[x]]G+_e[\mu[E]]H[2])$ are computed.

In addition, $A[COM]=A[i]a[2]^{\rho[m]}$ (mod n), $B[COM]=B[i]w^{\rho[r]}$ (mod l), $V[ComMPK]=a[1]^{\mu[x]}a[2]^{\mu[s]}A[COM]^{-\mu[e']}$ (mod n), and $V[ComREV]=w^{\mu[t]}B[COM]^{-\mu[e']}$ (mod l) are computed.

Subsequently, c=Hash(K, ipk, opk, rpk, E, A[COM], B[COM], V[ComCipher], V[ComMPK], V[ComRev], m) is computed.

Next, $\tau[x]=c\,x[i]+\mu[x]$ (mod q), $\tau[s]=c\,e[i]\rho[m]+\mu[s]$ (mod q), $\tau[t]=c\,e'[i]\,\rho[r]+\mu[t]$ (mod q), $\tau[e']=c\,e'[i]+\mu[e']$ (mod q), and $\tau[E]=c\rho[E]+\mu[E]$ (mod q) are computed.

Lastly, the signature (E, A[COM], B[COM], c, $\tau[x]$, $\tau[s]$, $\tau[t]$, $\tau[e']$, $\tau[E]$) is output.

On the other hand, when verifying a signature $\sigma=(E, A[COM], B[COM], c, \tau[x], \tau[s], \tau[t], \tau[e'], \tau[E])$ attached to the message m (where E=E[0], E[1], E[2]), the following is first computed: $V'[ComCipher]=([\tau[E]]G-_e[c]E[0], [\tau[x]]G+_e[\tau[E]]H[1], [\tau[x]]G+_e[\tau[E]]H[2]-_e[c]E[2])$.

Next, $p=c\,2^{K[2]+\tau[e']}$, $V'[ComMPK]=a[0]^c a[1]^{\tau[x]} a[2]^{\tau[s]}A[COM]^{-p}$ (mod n), and $V'[ComREV]=b^c w^{\tau[t]}B[COM]^{-\tau[e']}$ (mod l) are computed.

In addition, c'=Hash(K, ipk, opk, rpk, E, A[COM], B[COM], V'[ComCipher], V'[ComMPK], V'[ComREV], m) is computed.

Subsequently, if all of $|\tau[x]| \leq \lambda+K[c]+K[S]$, $|\tau[e']| \leq K[e']+K[c]+K[S]$, and c'=c hold, then verification succeeds. Otherwise, verification fails.

There is strong demand for a signature generation apparatus and a signature verification apparatus able to execute processing for computing group signatures at high speeds using an electronic circuit.

At the same time, since electronic circuits designed in a multi-layered manner are generally increasing in cost, it is preferable to realize a circuit configuration whereby manufacturing costs can be curtailed while still enabling increased speeds.

SUMMARY

Being devised in light of the foregoing, the present invention provides a signature generation apparatus and a signature verification apparatus suitable for realizing an electronic circuit that accelerates group signature generation and verification while also curtailing manufacturing costs.

A signature generation apparatus in accordance with an embodiment of the present invention generates signatures for a group signature.

The group signature is subject to
a predetermined bit-length $K[n]$,
a predetermined bit-length $K[l]$,
a predetermined bit-length $K[e]$,
a predetermined bit-length $K[e']$,
a bit-length $K[q]$ of a prime number q denoting the order of a finite group GG defined by an elliptic curve,
an output bit-length $K[c]$ returned by a hash function Hash applied to a bit sequence of arbitrary length,
a bit-length $K[S]$ such that when a random number r of bit-length $|a|+K[S]$ for any integer a is selected, then a+r and a are statistically indistinguishable,
security parameters $K=(K[n], K[l], K[e], K[e'], K[q], K[c], K[S])$,
an integer $\lambda=K[n]+K[q]+K[S]$,
a set of integer values $\Lambda$ in a range from 0 (inclusive) to $2^\lambda$ (exclusive),
scalar multiplication $[c](\cdot)$ on the elliptic curve,
point addition $+_e$ on the elliptic curve, and
point subtraction $-_e$ on the elliptic curve.

The Issuer's key pair for the group signature is
ipk=(n, a[0], a[1], a[2]);
isk=(p[1], p[2])
where p[1] and p[2] are safe prime numbers of bit-length $K[n]/2$; n=p[1]p[2]; and a[0], a[1], and a[2] are elements of the cyclic subgroup QR(n) with respect to n.

In addition, the Opener's key pair for the group signature is
opk=(q, G, H[1], H[2]);
osk=(y[1], y[2])
where y[1] and y[2] are elements of the prime number q-modulo finite field Zq, G is an element of the finite group GG, H[1]=[y[1]]G, and H[2]=[y[2]]G.

Additionally, the User-Revocation manager's key pair for the group signature is
rpk=(l, b, w);
rsk=(l[1], l[2])
where l[1] and l[2] are safe prime numbers of bit-length $K[l]/2$; l=l[1]l[2]; and b and w are elements of the cyclic subgroup QR(l) with respect to l.

In addition, the i-th user's key pair for the group signature is
msk[i]=x[i];
mpk[i]=(h[i], A[i], e'[i], B[i])
where x[i] is an element of the set $\Lambda$; and A[i], B[i], e'[i], and h[i] satisfy $h[i]=[x[i]]G$, $B[i]=b^{1/e'[i]} \pmod{l}$, $e[i]=2^{K[e]+e'[i]}$ and $a[0]a[1]^{x[i]} \equiv A[i]^{e[i]} \pmod{n}$.

The signature generation apparatus in accordance with an embodiment of the present invention generates a signature for a message m from the i-th user, and includes:

means (a selector) for randomly selecting an element $\rho[E]$ of the finite field Zq, a bit sequence $\rho[m]$ of bit-length $K[n]/2$, a bit sequence $\rho[r]$ of bit-length $K[l]/2$, a bit sequence $\mu[x]$ of bit-length $\lambda+K[c]+K[S]$, a bit sequence $\mu[s]$ of bit-length $K[e]+K[n]/2+K[c]+K[S]$, a bit sequence $\mu[e']$ of bit-length $K[e']+K[c]+K[S]$, a bit sequence $\mu[t]$ of bit-length $K[e']+K[l]/2+K[c]+K[S]$, and an element $\mu[E]$ of the finite field Zq;

means (a first computing unit) for computing $E[0]=[\rho[E]]G$, $E[1]=h[i]+_e[\rho[E]]H[1]$, $E[2]=h[i]+_e[\rho[E]]H[2]$, $E=(E[0], E[1], E[2])$, and $V[ComCipher]=([\mu[E]]G, [\mu[x]]G+_e[\mu[E]]H[1], [\mu[x]]G+_e[\mu[E]]H[2])$;

means (a second computing unit) for computing $A[COM]=A[i]a[2]^{\rho[m]} \pmod{n}$, $B[COM]=B[i]w^{\rho[r]} \pmod{l}$, $V[ComMPK]=a[1]^{\mu[x]}a[2]^{\rho[s]}A[COM]^{-\rho[e']} \pmod{n}$, and $V[ComREV]=w^{\mu[t]}B[COM]^{-\mu[e']} \pmod{l}$;

means (a third computing unit) for computing c=Hash(K, ipk, opk, rpk, E, A[COM], B[COM], V[ComCipher], V[ComMPK], V[ComRev], m);

means (a fourth computing unit) for computing $\tau[x]=c\,x[i]+\mu[x] \pmod{q}$, $\tau[s]=c\,e[i]\rho[m]+\mu[s] \pmod{q}$, $\tau[t]=c\,e'[i]\rho[r]+i[t] \pmod{q}$, $\tau[e']=c\,e'[i]+\mu[e'] \pmod{q}$, and $\tau[E]=c\,\rho[E]+\mu[E] \pmod{q}$; and means (an output unit) for outputting a signature (E, A[COM], B[COM], c, $\tau[x]$, $\tau[s]$, $\tau[t]$, $\tau[e']$, $\tau[E]$).

Among the computations herein, any two or three of $a[1]^{\mu[x]} \pmod{n}$, $a[2]^{\mu[s]} \pmod{n}$, and $w^{\mu[t]} \pmod{l}$ may be computed in parallel.

A signature verification apparatus in accordance with the present invention verifies signatures for a group signature.

The group signature is subject to
a predetermined bit-length $K[n]$,
a predetermined bit-length $K[l]$,
a predetermined bit-length $K[e]$,
a predetermined bit-length $K[e']$,
a bit-length $K[q]$ of a prime number q denoting the order of a finite group GG defined by an elliptic curve,
an output bit-length $K[c]$ returned by a hash function Hash applied to a bit sequence of arbitrary length,
a bit-length $K[S]$ such that when a random number r of bit-length $|a|+K[S]$ for any integer a is selected, then a+r and a are statistically indistinguishable,
security parameters $K=(K[n], K[l], K[e], K[e'], K[q], K[c], K[S])$,
an integer $\lambda=K[n]+K[q]+K[S]$, a set of integer values $\Lambda$ in a range from 0 (inclusive) to $2^\lambda$ (exclusive),
scalar multiplication $[c](\cdot)$ on the elliptic curve,
point addition $+_e$ on the elliptic curve, and
point subtraction $-_e$ on the elliptic curve.

The Issuer's key pair for the group signature is
ipk=(n, a[0], a[1], a[2]);
isk=(p[1], p[2])
where p[1] and p[2] are safe prime numbers of bit-length $K[n]/2$; n=p[1]p[2]; and a[0], a[1], and a[2] are elements of the cyclic subgroup QR(n) with respect to n.

In addition, the Opener's key pair for the group signature is
opk=(q, G, H[1], H[2]);
osk=(y[1], y[2])
where y[1] and y[2] are elements of the prime number q-modulo finite field Zq, G is an element of the finite group GG, H[1]=[y[1]]G, and H[2]=[y[2]]G.

Additionally, the User-Revocation manager's key pair for the group signature is
rpk=(l, b, w);
rsk=(l[1], l[2])

where l[1] and l[2] are safe prime numbers of bit-length K[l]/2; l=l[1]l[2]; and b and w are elements of the cyclic subgroup QR(l) with respect to l.

In addition, the i-th user's key pair for the group signature is msk[i]=x[i];

mpk[i]=(h[i], A[i], e'[i], B[i])

where x[i] is an element of the set Λ; and A[i], B[i], e'[i], and h[i] satisfy h[i]=[x[i]]G, B[i]=$b^{l/e'[i]}$ (mod l), e[i]=$2^{K[e]+e'[i]}$, and a[0]a[1]$^{x[i]}$≡A[i]$^{e[i]}$ (mod n).

The signature verification apparatus in accordance with the present invention verifies a signature σ=(E, A[COM], B[COM], c, τ[x], τ[s], τ[t], τ[e'], τ[E]) attached to a message m (where E=E[0], E[1], E[2]), and includes:

means (a first computing unit) for computing V'[ComCipher]=([τ[E]]G−$_e$[c]E[0], [τ[x]]G+$_e$[τ[E]]H[1], [τ[x]]G+$_e$[τ[E]]H[2]−$_e$[c]E[2]);

means (a second computing unit) for computing p=c $2^{K[2]+τ[e']}$, V'[ComMPK]=a[0]$^c$a[1]$^{τ[x]}$a[2]$^{τ[s]}$A[COM]$^{-p}$ (mod n), and V'[ComREV]=$b^c w^{τ[t]}$B[COM]$^{-τ[e']}$ (mod l);

means (a third computing unit) for computing c'=Hash(K, ipk, opk, rpk, E, A[COM], B[COM], V'[ComCipher], V'[ComMPK], V'[ComREV], m); and means (a verification judgment unit) for returning verification success when all of |τ[x]|≦λ+K[c]+K[S], |τ[e']|≦K[e']+K[c]+K[S], and c'=c hold, and returning verification failure otherwise.

Among the computations herein, any two or three of a[1]$^τ$[x] (mod n), a[2]$^{τ[s]}$ (mod n), and $w^{τ[t]}$ (mod l) may be computed in parallel.

BRIEF DESCRIPTION OF THE DRAWINGS

These objects and other objects and advantages of the present invention will become more apparent upon reading of the following detailed description and the accompanying drawings in which:

FIG. 1 illustrates clock cycles and other information used for various computations at the time of group signature generation.

FIG. 2 illustrates clock cycles and other information used for various computations at the time of group signature verification.

EXEMPLARY EMBODIMENTS

If the algorithm disclosed by Teranishi (see above) is simply stated as a behavioral level description, then the problem of curtailing manufacturing costs is not resolved, even when performing behavioral synthesis using the acceleration techniques of the electronic circuit design of the past. In light of the above, the inventors decided to conduct electronic circuit design using the following technique.

The present algorithm contains many complex combinations of primitive operations.

FIG. 1 is a table showing the bit lengths (Bit length), clock cycles (CLK cycles), execution times (Times), and ratios of total computation time (Ratio) with respect to each operation (Sub-IP operation) at the time of group signature generation.

FIG. 2 is a table showing the bit lengths (Bit length), clock cycles (CLK cycles), execution times (Times), and ratios of total computation time (Ratio) with respect to each operation (Sub-IP operation) at the time of group signature verification.

The tables in FIGS. 1 and 2 demonstrate that the types of primitive operations used are different from those in algorithms advanced by electronic circuit conversion of the related art. Moreover, the numbers of clock cycles spent by the primitive operations also differ. For the sake of increasing the speed, it can be seen that parallelization is desirable from a different perspective from that of the related art.

Furthermore, FIGS. 1 and 2 demonstrate that since the bit lengths of the data are large, almost all of the data is stored in SRAM (static random access memory) rather than registers. In addition, the majority of calculation time spent by each primitive operation is time spent accessing the SRAM.

In contrast, FIGS. 1 and 2 also show that the ratio of time used to transfer data is extremely low.

Focusing on the above points, the inventors proceeded with electronic circuit design with constraints added to the behavioral level description as a basic hardware architecture such that all circuitry for group authentication computations are enclosed in a single IP core.

Figure 3:
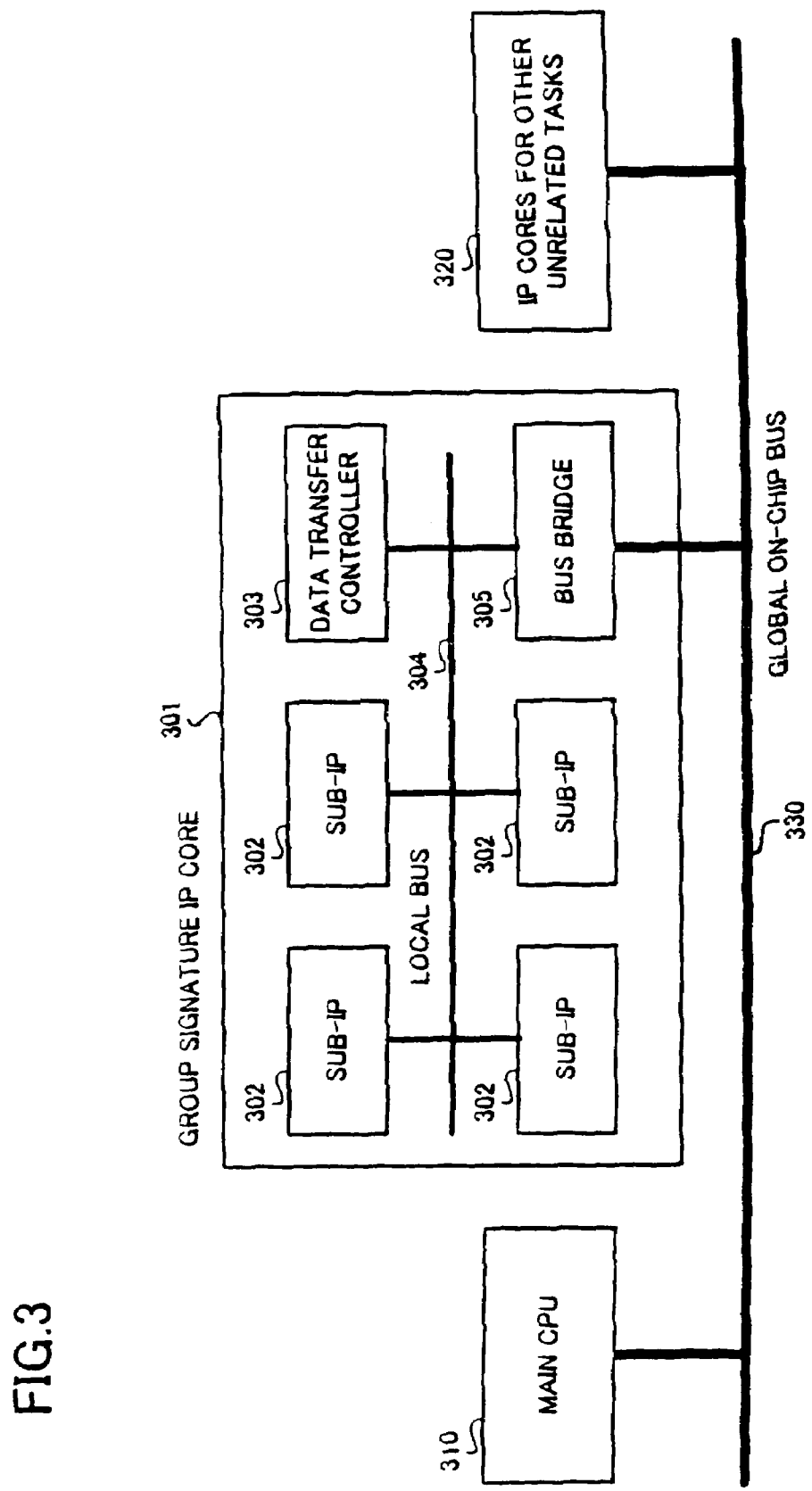
FIG. 3 is a block diagram illustrating a schematic configuration of an IP core provided in a signature generation apparatus in accordance with an embodiment of the present invention.

FIG. 3 is a block diagram illustrating a schematic configuration of an IP core provided in a signature generation apparatus in accordance with an embodiment of the present invention.

The IP core 301 (i.e., the group signature IP core) includes a plurality of fast arithmetic units (sub-IPs) 302, a data transfer controller 303, and a bus bridge 305, which are each connected to a local bus 304.

In the present embodiment, a single narrow-band bus is used as the local bus 304. This is a technique specific to group signature algorithms, and was obtained as a result of the inventors conducting analyses such as the above and considering solutions from a perspective different from those of the techniques of the past.

As described earlier, one circumstance specific to group signature algorithms is the extremely low ratio of computation time spent performing data transfer. For this reason, the amount of transfer traffic on the bus can be considered to be small, there is very little need to use multiple buses or wideband buses, even when configuring a high-performance circuit.

In other words, although increasing the bus bandwidth in order to increase performance is a standard technique in typical circuit architecture design, the circumstances of group signature algorithms described above enable increased performance without increasing the bus bandwidth.

Moreover, certain operations in group signature algorithms are weakly dependent on data, and thus potentially can be computed in parallel. Consequently, computation can be accelerated by conducting the computations in each sub-IP 302 in parallel and exchanging computational results via the local bus 304 as appropriate.

Furthermore, by adopting a single-bus architecture, it becomes trivial to modify configuration parameters, such as increasing or decreasing the number of sub-IPs 302. In this case, since there is a conceivable upper limit on the parallelization potential intrinsic to group signature algorithms, it is possible to curtail manufacturing costs and other aspects of the electronic circuit by determining the number of sub-IPs 302 in accordance with this limit.

A main CPU 310 controls each IP core connected on a global on-chip bus 330 (such as the IP core 301 or other IP cores 320 for unrelated tasks, for example). In so doing, the main CPU 310 controls the overall operation of the signature generation apparatus (or signature verification apparatus). The main CPU 310 may, for example, execute a signature generation program (or signature verification program) stored in ROM (not shown).

The global on-chip bus 330 connects the main CPU 310, the IP core 301, and the IP cores 320 for unrelated tasks to each other.

The bus bridge 305 connects the local bus 304 in the IP core 301 and the global on-chip bus 330 to each other.

The individual sub-IPs 302 are associated with elliptic curve (EC), modular, long-bit integer, and hash operations, respectively. In addition, each sub-IP 302 has multiple function modes depending on the type of operation and data bit width.

The above operations are used in the calculation of the group authentication algorithm disclosed by Teranishi (see above). In other words, the EC operations involve scalar multiplication, addition, and subtraction ($[c](\cdot)$, $+_e$, and $-_e$) on an elliptic curve. The modular operations involve modular exponentiation ($a^b \pmod{n}$) and modular multiplication ($a\,b \pmod{n}$) computations. The hash operations involve computing a hash value from a bit string.

Figure 4:
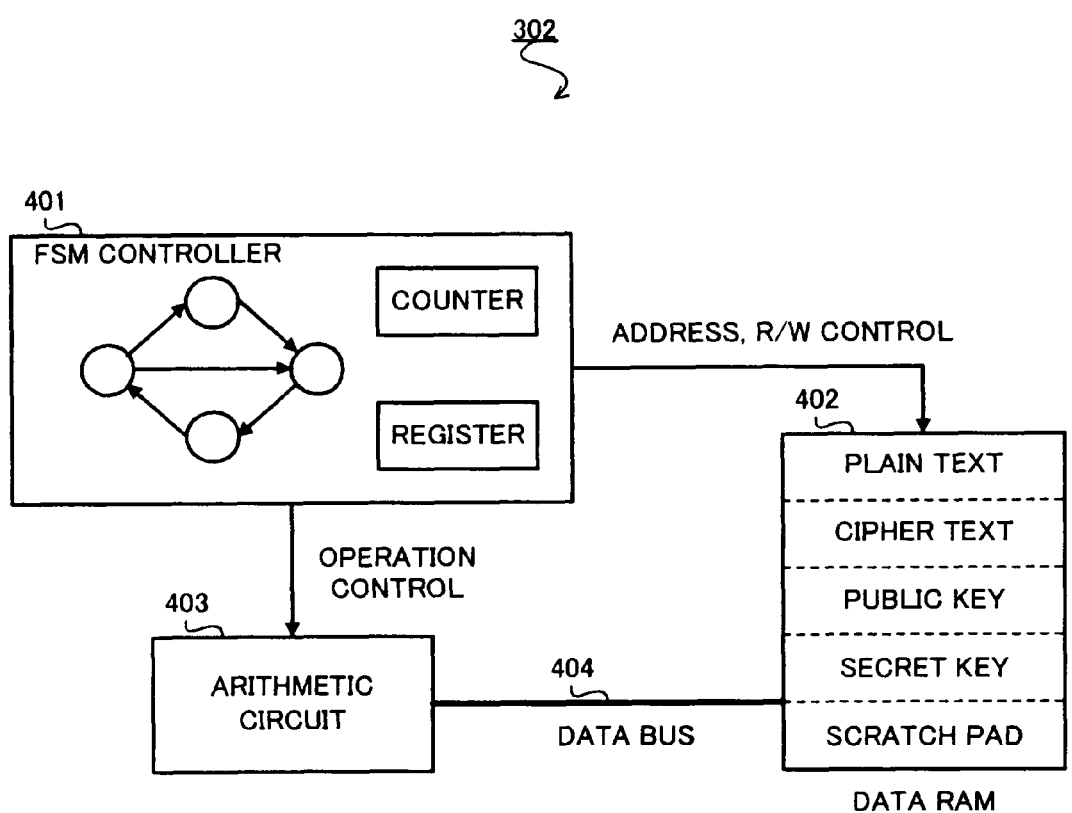
FIG. 4 is a diagram for explaining the internal configuration of a sub-IP.

FIG. 4 is a diagram for explaining the internal configuration of a sub-IP 302. Hereinafter, the description will refer to FIG. 4.

As shown in FIG. 4, each sub-IP 302 is controlled by a finite state machine (FSM) controller 401, and data to be processed is stored in data RAM 402.

An arithmetic circuit 403 conducts various arithmetic operations. For fast computation, modular arithmetic is computed on the Montgomery domain, and EC arithmetic is computed on Jacobian coordinates of the Montgomery number representation.

The arithmetic circuit 403 is connected to the data RAM 402 via a data bus 404, and writes and reads data to and from the data RAM 402. If the number of ports in the data RAM 402 is set equal to the maximum number of simultaneous R/W accesses, fast processing can be expected.

Figure 5:
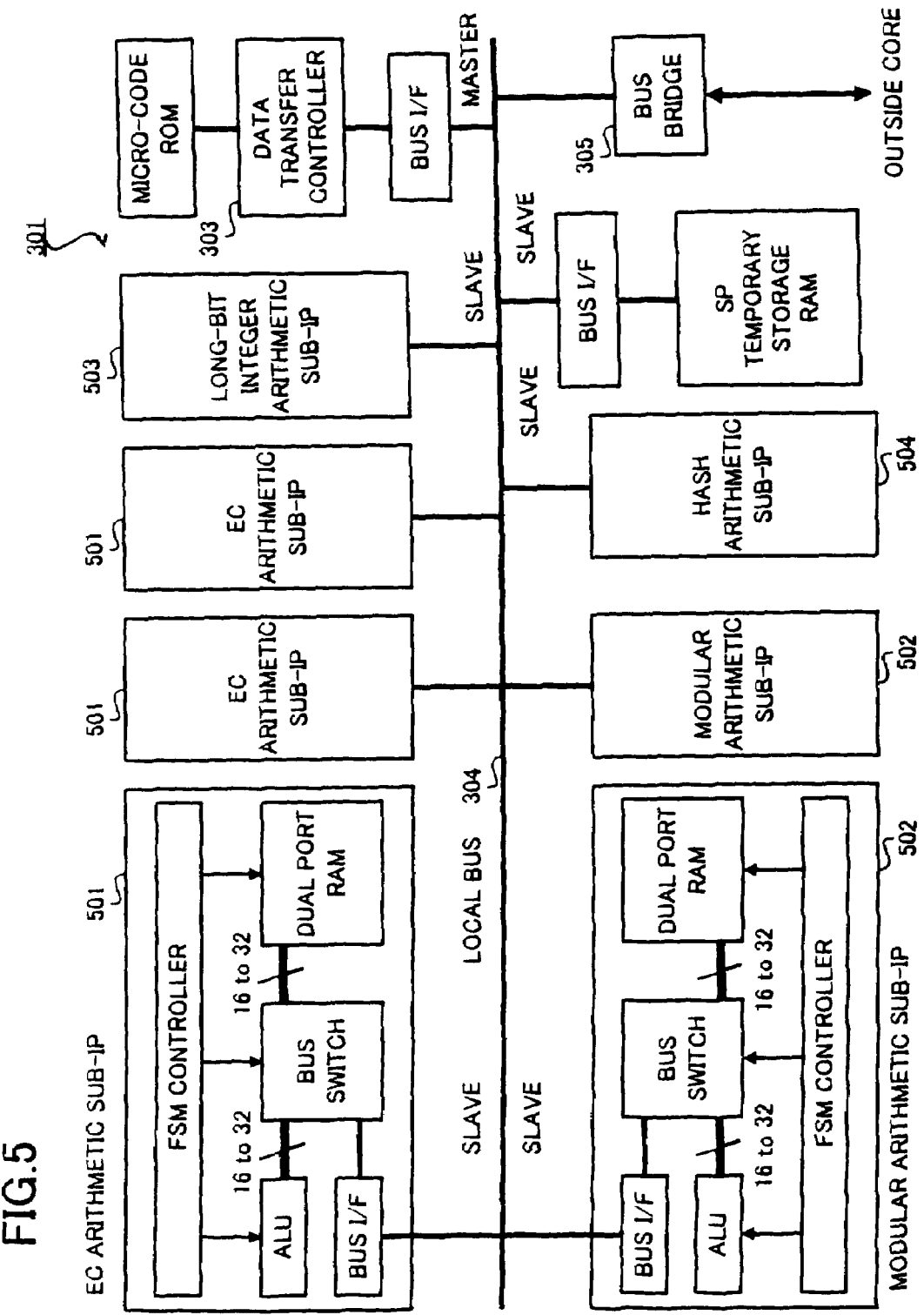
FIG. 5 is a block diagram for explaining an IP core in detail.

FIG. 5 is a block diagram for explaining in detail the IP core 301 connected to each sub-IP 302.

As shown in FIG. 5, the IP core 301 in accordance with the present embodiment includes one to four EC arithmetic sub-IPs 501, one to five modular arithmetic sub-IPs 502 (also referred to as RSA arithmetic sub-IPs), one long-bit integer arithmetic sub-IP 503, and one hash arithmetic sub-IP 504, the above being connected by a local bus 304. The local bus 304 herein is a narrow-band, single-layer bus.

The types and numbers of sub-IPs 302 are preferably within the above range, from the perspective of computational acceleration and reducing costs by curtailing circuit area. Further acceleration is not to be expected if the number of sub-IPs 302 is increased beyond the above. Furthermore, by adopting the narrow-band, single-layer local bus 304, bus wiring is simplified, and this further contributes to reduced costs.

Figure 6:
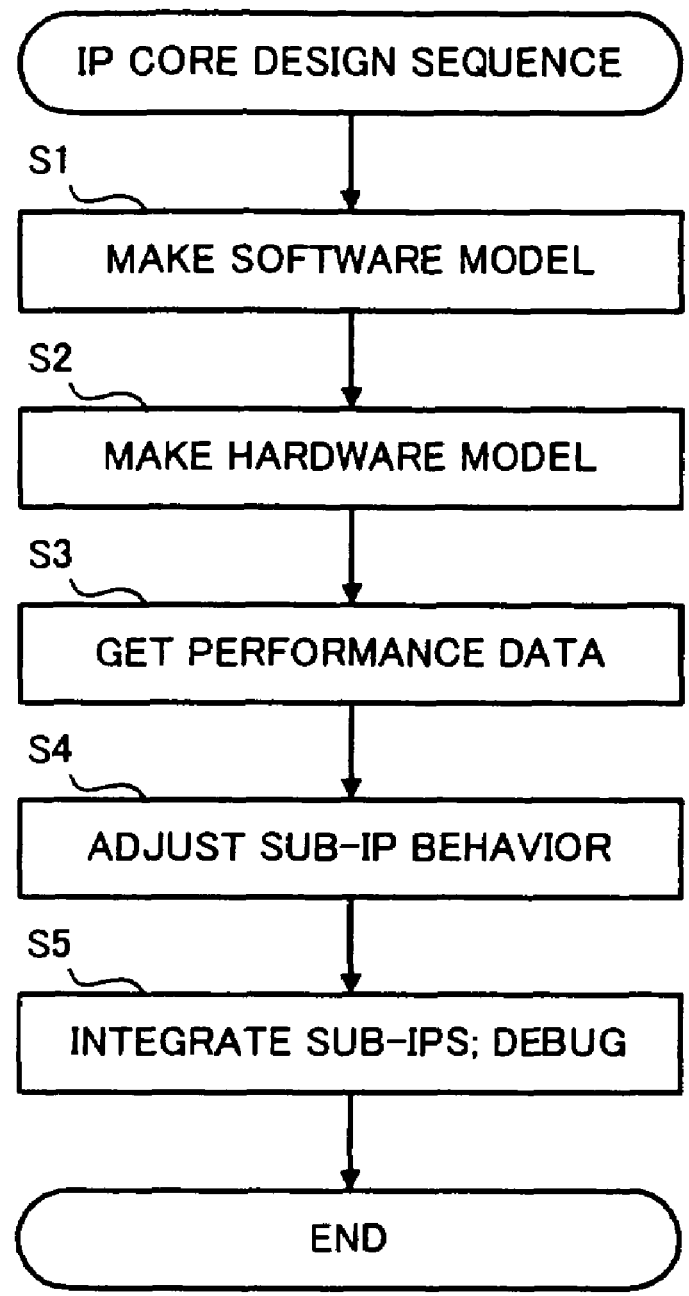
FIG. 6 is a flowchart for explaining a methodology for designing an IP core.

FIG. 6 is a flowchart for explaining a methodology for designing the IP core 301 in accordance with the present embodiment. Hereinafter, the description will refer to FIG. 6.

In the present design, a conventional building-block approach is adopted. In other words, each sub-IP 302 is tested individually prior to total integration of the IP core 301.

First, in step S1, a computational model is constructed in software by programming using a language such as C or C++.

Next, in step S2, a hardware model wherein each sub-IP 302 is connected by the local bus 304 is suitably set and constructed.

In step S3, standard behavioral adjustment is conducted to acquire performance data.

Additionally, in step S4, behavioral adjustment of each sub-IP 302 is conducted, and the sub-IPs 302 are made to operate in parallel.

Finally, in step S5, the sub-IPs 302 are integrated with the IP core 301, and behavioral debugging is conducted using an FPGA prototype.

In steps S1, S2, S3, and S5, C-based hardware modeling, behavioral adjustment, and FPGA prototyping are conducted. At this point, new models like those shown in FIGS. 3 to 5 are adopted. However, once a model has been adopted, the specific methodologies can implement well-known technology. Such a configuration is used for the following reasons:

(1) Each sub-IP 302 can be efficiently developed without conducting RTL simulation. The simulation of each sub-IP 302 can be completed faster than simulation of the entire IP core 301. By subdividing the design and integrating later, the amount of work involved is drastically reduced.

(2) High configurability of the total performance becomes possible. The performance of each sub-IP 302 is largely governed by the type of the data RAM 402. For this reason, changing the type of the data RAM 402 after constructing the entire IP core 301 is difficult from a design standpoint.

(3) Although a building-block approach is adopted, verification of the entire IP core 301 is still necessary in order to debug the micro-code (i.e., firmware) of the data transfer controller 303. Since RTL simulation is extremely slow for such verification, constructing an FPGA prototype for debugging is more appropriate.

Even though there has been significant progress in behavioral synthesis techniques in recent years, it is still difficult to synthesize efficient hardware from pure C software codes without any modification. For this reason, some amount of rewriting work is necessary in step S2 of FIG. 6. The necessary processes are given hereinafter.

(1) Data Bit-Width Optimization and Removal of Excess Operations.

Not only group signature but also public key cryptographic software usually use special function libraries. The functions in such function libraries execute long-bit arithmetic operations by combining 32-bit or 64-bit C-embedded integer operations. For this reason, it is necessary to also implement overflow control in software. However, in hardware, direct computation on arbitrary bit-widths is possible.

(2) Optimization of Arithmetic Operations and Number Representation.

While only integer operations on the 2's complement representation can be used in software, flexible construction of a variety of operations on a variety of number representations (such as GF operations on a residual number system) is possible in hardware.

(3) Removal of Dynamic Memory Allocation, Dynamic Pointers, and Recursion.

Data types such as balance trees and linear lists must also be removed if used.

(4) Addition of Appropriate Behavioral Synthesis Control Operations to the Source Code.

One of the most frequently used options is loop folding, which is attached to the inner loop. For example, when there is a call to access the SRAM (i.e., a call for checking the SRAM) within the loop, there is a possibility that the behavioral synthesizer will determine that the processing expressed by the call is redundant, and then synthesize with that call omitted. The above option is used in order to prevent such a situation.

The resulting performance of synthesized units (i.e., the performance result) is comparable to that of conventional hand-made RTL of RSA and ECC. The number of clock cycles is independent of ASIC/FPGA process libraries.

Herein, the total IP performance is mostly determined by how many sub-IP operations are executed in parallel. However, standard behavioral synthesizers only support parallel scheduling of C-embedded operators (+, −, ×, /, %), and support neither scheduling of higher level functions nor scheduling of functions whose operation mode is determined at run time.

Therefore, a custom sub-IP level (C function-library level) behavioral synthesizer was made and used. The inputs for the behavioral synthesizer are:

(i) a sequential description of the entire algorithm;
(ii) the number of sub-IPs; and
(iii) clock cycles for every operation in sub-IPs, which are obtained by RTL simulation, FPGA prototyping, or theoretical estimation.

Using the above inputs, the behavioral synthesizer outputs a paralleled computation sequence, wherein the start order of each sub-IP operation and sub-IP unit number assignments are specified. This output is used to write micro-code for the data transfer controller.

The behavioral synthesizer solves a resource constrained project scheduling problem (RCPSP) using heuristics such that when a corresponding sub-IP is available, the behavioral synthesizer assigns operations with longer execution times and immediately initiates the operations.

The behavioral synthesizer herein is specific to the group signature, and many general ESL/TLM synthesis issues are omitted in the following respects:

(1) data transfer time between sub-IPs can be ignored;
(2) exploring and synthesizing local-bus topology are unnecessary; and
(3) constructing a macro pipeline and synthesizing the data transfer protocol are unnecessary.

Using the above behavioral synthesizer, the relationship between the total computation speed and the number of sub-IPs was investigated. The results of signature generation and verification at standard and high security levels are shown in FIGS. 7 to 10.

Figure 7:
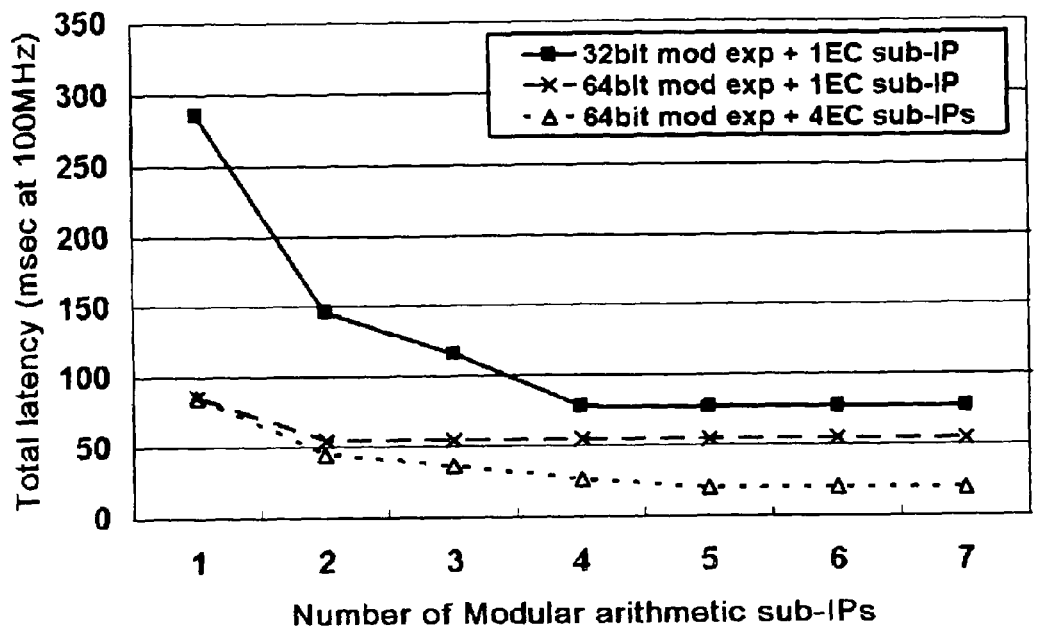
FIG. 7 illustrates the relationship between the number of modular arithmetic sub-IPs and the total latency at the time of signature generation at a standard security level.
Figure 8:
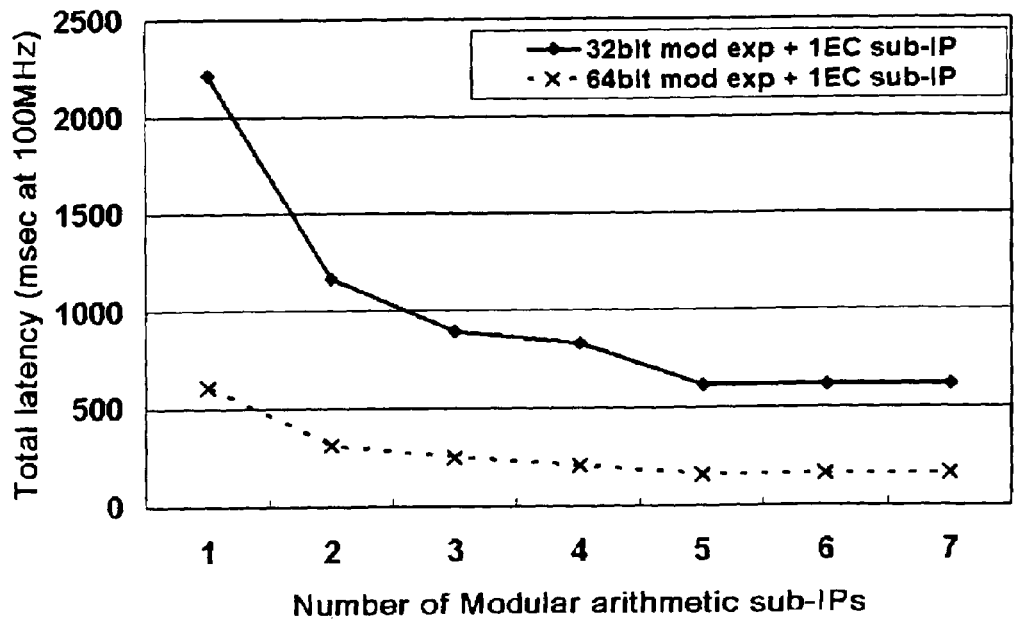
FIG. 8 illustrates the relationship between the number of modular arithmetic sub-IPs and the total latency at the time of signature generation at a high security level.
Figure 9:
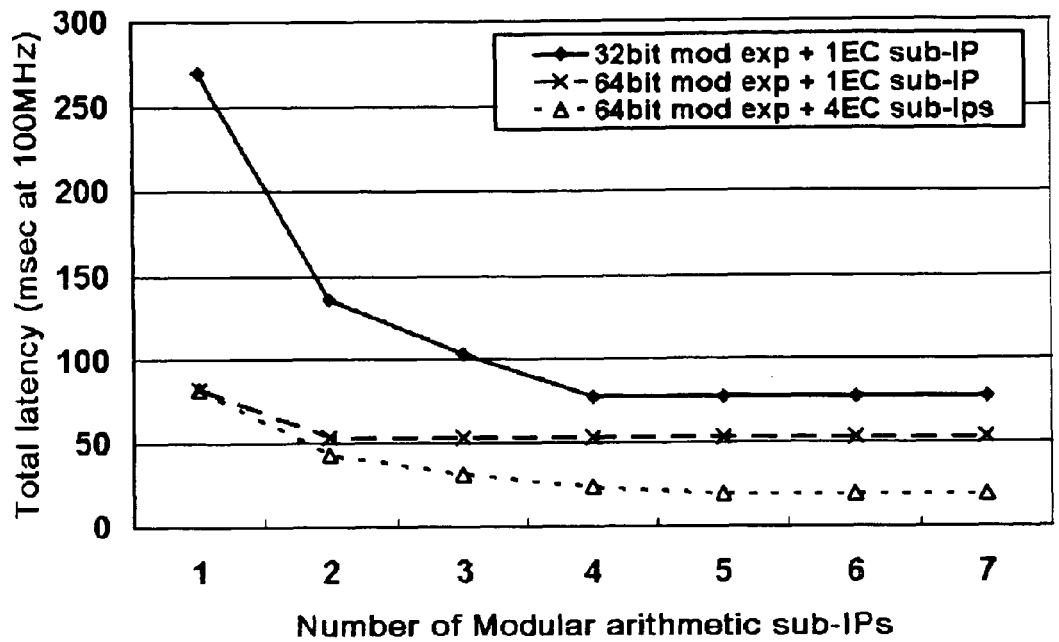
FIG. 9 illustrates the relationship between the number of modular arithmetic sub-IPs and the total latency at the time of signature verification at a standard security level.
Figure 10:
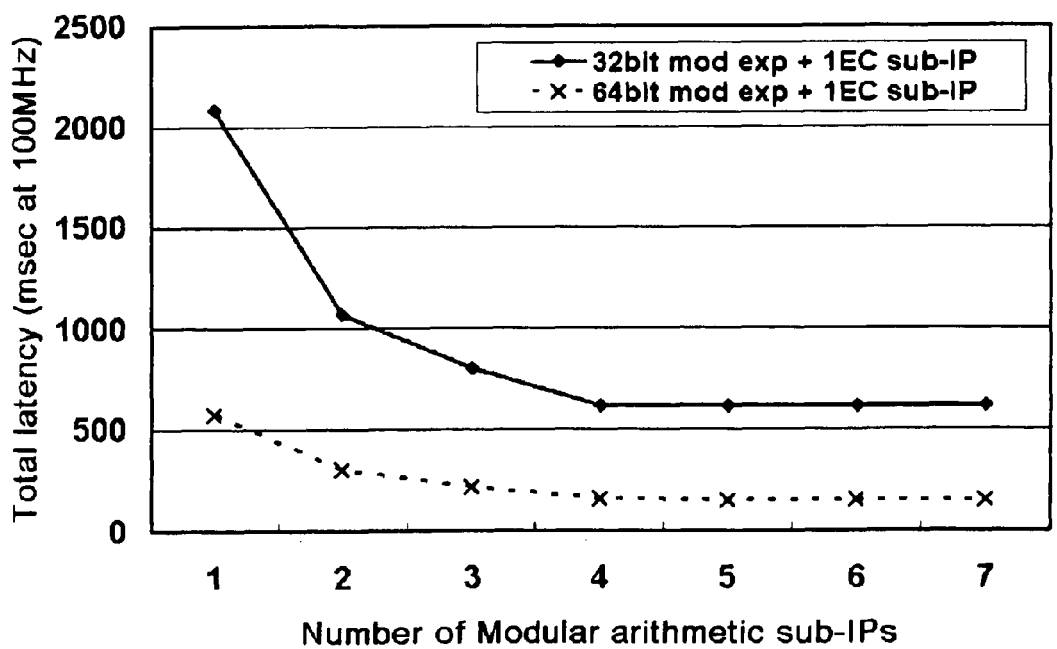
FIG. 10 illustrates the relationship between the number of modular arithmetic sub-IPs and the total latency at the time of signature verification at a high security level.

FIG. 7 illustrates the relationship between the number of modular arithmetic sub-IPs and the total latency (msec at 100 MHz) at the time of signature generation at a standard security level. FIG. 8 illustrates the relationship between the number of modular arithmetic sub-IPs and the total latency at the time of signature generation at a high security level. FIG. 9 illustrates the relationship between the number of modular arithmetic sub-IPs and the total latency at the time of signature verification at a standard security level. FIG. 10 illustrates the relationship between the number of modular arithmetic sub-IPs and the total latency at the time of signature verification at a high security level.

Although these results are obtained from the absolute values of the clock cycle counts shown in FIGS. 1 and 2, similar results will be obtained even if process libraries or target devices are changed, since the number of clock cycles is independent of libraries.

If all operations are executed in serially, then more than 80% of the total computation time is occupied by modular exponentiation, as shown in FIGS. 1 and 2. Thus, increasing the number of modular arithmetic sub-IPs significantly improves total speed, and maximum speed is reached when four or five modular arithmetic sub-IPs are used. Furthermore, increasing the number of other sub-IPs has no effect except when using 64-bit modular exponentiation at a standard security level.

In addition, increasing the data bit width of the RAM and the Montgomery multiplier in the modular arithmetic sub-IPs is similarly effective. The number of clock cycles consumed by modular exponentiation is $O((n1/m)^2 n2)$, where m is the bit width of the RAM, n1 is the bit width of the base (1024 or 2048), and n2 is the bit width of the exponent. Maximum clock frequency is slowed on the order of $O(1/\log m)$ if m increases, yet the effect of the slowdown is small compared to the reduction in the number of clock cycles.

Another important observation is that the optimum number of sub-IPs is the same between signature generation and verification. Given this fact, it is possible to use the same hardware for generation and verification without dropping performance.

Consider, for example, the circuit size of each sub-IP (at standard security level) when implemented in a 130 nm standard cell ASIC. If an AHB single-layer bus is used as the local bus, then the total circuit size becomes 350K gates when the number of each sub-IP is one. One additional modular arithmetic unit increases the total circuit size by 50K gates.

If a high security level is selected, the number of logic gates remains the same, and the amount of SRAM is doubled. If mapped to 130 nm standard cell libraries, the maximum clock frequency is 150 MHz to 200 MHz under the worst delay conditions. The inventors mapped a similar circuit onto an FPGA device and confirmed that signature generation and verification can be correctly executed within an expected time.

As described in the foregoing, according to the present invention, a signature generation apparatus and a signature verification apparatus are provided, being suitable for realizing an electronic circuit that accelerates group signature generation and verification while also curtailing manufacturing costs.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A signature generation apparatus generating signatures for a group signature, the group signature being subject to:
   a predetermined bit-length K[n];
   a predetermined bit-length K[l];
   a predetermined bit-length K[e];
   a predetermined bit-length K[e'];
   a bit-length K[q] of a prime number q denoting the order of a finite group GG defined by an elliptic curve;
   an output bit-length K[c] returned by a hash function Hash applied to a bit sequence of arbitrary length;

a bit-length K[S] such that when a random number r of bit-length |a|+K[S] for any integer a is selected, then a+r and a are statistically indistinguishable;

security parameters K=(K[n], K[l], K[e], K[e'], K[q], K[c], K[S]);

an integer λ=K[n]+K[q]+K[S];

a set of integer values Λ in a range from 0 (inclusive) to $2^λ$ (exclusive);

scalar multiplication [c](·) on the elliptic curve; and point addition $+_e$ on the elliptic curve, wherein an Issuer's key pair for the group signature comprises ipk=(n, a[0], a[1], a[2]);

isk=(p[1], p[2]);

where p[1] and p[2] are safe prime numbers of bit-length K[n]/2;

n=p[1]p[2]; and a[0], a[1], and a[2] are elements of a cyclic subgroup QR(n) with respect to n, wherein an Opener's key pair for the group signature comprises:

opk=(q, G, H[1], H[2]);

osk=(y[1], y[2]); and where y[1] and y[2] are elements of a prime number q-modulo finite field Zq, G comprises an element of the finite group GG, and H[1]=[y[1]]G, and H[2]=[y[2]]G, wherein a User-Revocation manager's key pair for the group signature comprises:

rpk=(l, b, w);

rsk=(l[1], l[2]);

where l[1] and l[2] are safe prime numbers of bit-length K[l]/2;

l=l[1]l[2]; and b and w are elements of the cyclic subgroup QR(l) with respect to l, wherein an i-th User's key pair for the group signature comprises:

msk[i]=x[i];

mpk[i]=(h[i], A[i], e'[i], B[i]);

where x[i] comprises an element of the set Λ; and

A[i], B[i], e'[i], and h[i] satisfy h[i]=[x[i]]G, B[i]=$b^{1/e'[i]}$ (mod l), e[i]=$2^{K[e]+e'[i]}$, and a[0]a[1]$^{x[i]}$≡A[i]$^{e[i]}$ (mod n), wherein the signature generation apparatus generates a signature for a message m from the i-th user, the signature generation apparatus comprising:

a selector that randomly selects an element ρ[E] of the finite field Zq, a bit sequence ρ[m] of bit-length K[n]/2, a bit sequence ρ[r] of bit-length K[l]/2, a bit sequence μ[x] of bit-length λ+K[c]+K[S], a bit sequence μ[s] of bit-length K[e]+K[n]/2+K[c]+K[S], a bit sequence μ[e'] of bit-length K[e']+K[c]+K[S], a bit sequence μ[t] of bit-length K[e']+K[l]/2+K[c]+K[S], and an element μ[E] of the finite field Zq;

a first computing unit that computes E[0]=[ρ[E]]G, E[1]=h[i]$+_e$[ρ[E]]H[1], E[2]=h[i]$+_e$[ρ[E]]H[2], E=(E[0], E[1], E[2]), and V[ComCipher]=[μ[E]]G, [μ[x]]G$+_e$[μ[E]]H[1], [μ[x]]G$+_e$[μ[E]]H[2]);

a second computing unit that computes A[COM]=A[i]a[2]$^{ρ[m]}$ (mod n), B[COM]=B[i]$w^{ρ[r]}$ (mod l), V[ComMPK]=a[1]$^{μ[x]}$a[2]$^{μ[s]}$A[COM]$^{-μ[e']}$ (mod n), and V[ComREV]=$w^{μ[t]}$B[COM]$^{-μ[e']}$ (mod l);

a third computing unit that computes c=Hash(K, ipk, opk, rpk, E, A[COM], B[COM], V[ComCipher], V[ComMPK], V[ComRev], m);

a fourth computing unit that computes τ[x]=c x[i]+μ[x] (mod q), τ[s]=c e[i] ρ[m]+μ[s] (mod q), τ[t]=c e'[i]ρ[r]+μ[t] (mod q), τ[e']=c e'[i]+μ[e'] (mod q), and τ[E]=c ρ[E]+μ[E] (mod q); and an output unit that outputs a signature (E, A[COM], B[COM], c, τ[x], τ[s], τ[e'], τ[E]), wherein, among the above computations, any two or three of a[1]$^{μ[x]}$ (mod n), a[2]$^{μ[s]}$ (mod n), and $w^{μ[t]}$ (mod l) are computed in parallel, wherein one or a plurality of RSA computing circuits compute the modular exponentiation and modular multiplication operations, wherein an elliptic curve computing circuit computes the scalar multiplication [c](·) on the elliptic curve and the point addition $+_e$ on the elliptic curve, wherein a hash computing circuit computes the hash operations, and wherein a single bus transfers computational results among the elliptic curve computing circuit, the one or the plurality of RSA computing circuits, and the hash computing circuit.

2. The signature generation apparatus according to claim 1, wherein the one or the plurality of RSA computing circuits include one to five modular exponentiation computing circuits.

3. The signature generation apparatus according to claim 1, wherein the single bus comprises a narrow-band bus.

4. The signature generation apparatus according to claim 1, wherein the single bus comprises a local bus.

5. A signature generation apparatus generating signatures for a group signature, the group signature being subject to:

a predetermined bit-length, K[n];

a predetermined bit-length, K[l];

a predetermined bit-length, K[e];

a predetermined bit-length K[e'];

a bit-length K[q] of a prime number q denoting the order of a finite group GG defined by an elliptic curve;

an output bit-length K[c] returned by a hash function Hash applied to a bit sequence of arbitrary length;

a bit-length K[S] such that when a random number r of bit-length |a|+K[S] for any integer a is selected, then a+r and a are statistically indistinguishable;

security parameters K=(K[n], K[l], K[e], K[e'], K[q], K[c], K[S]);

an integer λ=K[n]+K[q]+K[S];

a set of integer values Λ in a range from 0 (inclusive) to $2^λ$ (exclusive);

scalar multiplication [c](·) on the elliptic curve; and point addition $+_e$ on the elliptic curve, wherein an Issuer's key pair for the group signature comprises:

ipk=(n, a[0], a[1], a[2]);

where p[1] and p[2] are safe prime numbers of bit-length K[n]/2;

n=p[1]p[2]; and a[0], a[1], and a[2] are elements of a cyclic subgroup QR(n) with respect to n, wherein an Opener's key pair for the group signature comprises:

opk=(q, G, H[1], H[2]);

osk=(y[1], y[2]); and where y[1] and y[2] are elements of the prime number q-modulo finite field Zq, G is an element of the finite group GG, H[1]=[y[1]]G, and H[2]=[y[2]]G, wherein a User-Revocation manager's key pair for the group signature is comprises:

rpk=(l, b, w);
rsk=(l[1], l[2]);
where l[1] and l[2] are safe prime numbers of bit-length K[l]/2;
l=l[1]l[2]; and
b and w are elements of the cyclic subgroup QR(l) with respect to l,
wherein an i-th User's key pair for the group signature comprises:
msk[i]=x[i];
mpk[i]=(h[i], A[i], e'[i], B[i]);
where x[i] comprises an element of the set $\Lambda$; and
A[i], B[i], e'[i], and h[i] satisfy h[i]=[x[i]]G, B[i]=$b^{1/e'[i]}$ (mod l), e[i]=$2^{K[e]+e'[i]}$, and $a[0]a[1]^{x[i]} \equiv A[i]^{e[i]}$ (mod n),
wherein the signature generation apparatus generates a signature for a message m from the i-th user, the signature generation apparatus comprising:
means for randomly selecting an element $\rho$[E] of the finite field Zq, a bit sequence $\rho$[m] of bit-length K[n]/2, a bit sequence $\rho$[r] of bit-length K[l]/2, a bit sequence $\mu$[x] of bit-length $\lambda$+K[c]+K[S], a bit sequence $\mu$[s] of bit-length K[e]+K[n]/2+K[c]+K[S], a bit sequence $\mu$[e'] of bit-length K[e']+K[c]+K[S], a bit sequence $\mu$[t] of bit-length K[e']+K[l]/2+K[c]+K[S], and an element $\mu$[E] of the finite field Zq;
means for computing E[0]=[$\rho$[E]]G, E[1]=h[i]+$_e$[$\rho$[E]]H[1], E[2]=h[i]+$_e$[$\rho$[E]]H[2], E=(E[0], E[1], E[2]), and V[ComCipher]=([$\mu$[E]]G, [$\mu$[x]]G+$_e$[$\mu$[E]]H[1], [$\mu$[x]]G+$_e$[$\mu$[E]]H[2]);
means for computing A[COM]=A[i]a[2]$^{\rho[m]}$ (mod n), B[COM]=B[i]$w^{\rho[r]}$ (mod l), V[ComMPK]=a[1]$^{\mu[x]}$a[2]$^{\mu[s]}$A[COM]$^{-\mu[e']}$ (mod n), and V[ComREV]=$w^{\mu[t]}$B[COM]$^{-\mu[e']}$ (mod l);
means for computing c=Hash(K, ipk, opk, rpk, E, A[COM], B[COM], V[ComCipher], V[ComMPK], V[ComRev], m);
means for computing $\tau$[x]=c x[i]+$\mu$[x] (mod q), $\tau$[s]=c e[i]$\rho$[m]+$\mu$[s] (mod q), $\tau$[t]=c e'[i]$\rho$[r]+$\mu\tau$[t] (mod q), $\tau$[e']=c e'[i]+$\mu$[e] (mod q), and $\tau$[E]=c $\rho$[E]+$\mu$[E] (mod q); and
means for outputting a signature (E, A[COM], B[COM], c, $\tau$[x], $\tau$[s], $\tau$[t], $\tau$[e'], $\tau$[E]),
wherein, among the above computations, any two or three of a[1]$^{\mu[x]}$ (mod n), a[2]$^{\mu[s]}$ (mod n), and $w^{\mu[t]}$ (mod l) are computed in parallel,
wherein an elliptic curve computing circuit computes the scalar multiplication [c]($\cdot$) on the elliptic curve and the point addition +$_e$ on the elliptic curve,
wherein one or a plurality of RSA computing circuits compute the modular exponentiation and modular multiplication operations,
wherein a hash computing circuit computes the hash operations, and
wherein a single bus transfers computational results among the elliptic curve computing circuit, the one or the plurality of RSA computing circuits, and the hash computing circuit.

6. A signature verification apparatus verifying signatures for a group signature, the group signature being subject to:
a predetermined bit-length K[n];
a predetermined bit-length K[l];
a predetermined bit-length K[e];
a predetermined bit-length K[e];
a bit-length K[q] of a prime number q denoting the order of a finite group GG defined by an elliptic curve;
an output bit-length K[c] returned by a hash function Hash applied to a bit sequence of arbitrary length;
a bit-length K[S] such that when a random number r of bit-length |a|+K[S] for any integer a is selected, then a+r and a are statistically indistinguishable;
security parameters K=(K[n], K[l], K[e], K[e'], K[q], K[c], K[S]);
an integer $\lambda$=K[n]+K[q]+K[S];
a set of integer values $\Lambda$ in a range from 0 (inclusive) to $2^\lambda$ (exclusive);
scalar multiplication [c]($\cdot$) on the elliptic curve;
point addition +$_e$ on the elliptic curve; and
point subtraction −$_e$ on the elliptic curve,
wherein an Issuer's key pair for the group signature comprises:
ipk=(n, a[0], a[1], a[2]);
isk=(p[1], p[2]);
where p[1] and p[2] are safe prime numbers of bit-length K[n]/2;
n=p[1]p[2]; and
a[0], a[1], and a[2] are elements of a cyclic subgroup QR(n) with respect to n,
wherein an Opener's key pair for the group signature comprises:
opk=(q, G, H[1], H[2]);
osk=(y[1], y[2]); and
where y[1] and y[2] are elements of the prime number q-modulo finite field Zq, G comprises an element of the finite group GG, H[1]=[y[1]]G, and H[2]=[y[2]]G,
wherein a User-Revocation manager's key pair for the group signature comprises
rpk=(l, b, w);
rsk=(l[1], l[2]);
where l[1] and l[2] are safe prime numbers of bit-length K[l]/2;
l=l[1]l[2]; and
b and w are elements of the cyclic subgroup QR(l) with respect to l,
wherein an i-th User's key pair for the group signature comprises:
mpk[i]=x[i];
mpk[i]=(h[i], A[i], e'[i], B[i]);
where x[i] comprises an element of the set $\Lambda$; and
A[i], B[i], e'[i], and h[i] satisfy h[i]=[x[i]]G, B[i]=$b^{1/e'[i]}$ (mod l), e[i]=$2^{K[e]+e'[i]}$, and $a[0]a[1]^{x[i]} \equiv A[i]^{e[i]}$ (mod n),
wherein the signature verification apparatus verifies a signature $\sigma$=(E, A[COM], B[COM], c, $\tau$[x], $\tau$[s], $\tau$[t], $\tau$[e'], $\tau$[E]) attached to a message m (where E=E[0], E[1], E[2]), the signature verification apparatus comprising:
a first computing unit that computes V'[ComCipher]=([$\tau$[E]]G−$_e$ [c]E[0], [$\tau$[x]]G+$_e$ [$\tau$[E]]H[1], [$\tau$[x]]G+$_e$ [$\tau$[E]]H[2]−$_e$ [c]E[2]);
a second computing unit that computes p=c $2^{K[2]+\tau[e']}$, V'[ComMPK]=a[0]$^c$a[1]$^{\tau[x]}$a[2]$^{\tau[s]}$A[COM]$^{-p}$ (mod n), and V'[ComREV]=$b^c w^{\tau[t]}$B[COM]$^{-\tau[e']}$ (mod l);
a third computing unit that computes c'=Hash(K, ipk, opk, rpk, E, A[COM], B[COM], V'[ComCipher], V'[ComMPK], V'[ComREV], m);
a verification judgment unit that returns verification success when all of |$\tau$[x]|$\leq\lambda$+K[c]+K[S], |$\tau$[e']|$\leq$K[e']+K[c]+K[S], and c'=c hold, and returns verification failure otherwise,
wherein, among the above computations, any two or three of a[1]$^{\tau[x]}$ (mod n), a[2]$^{\tau[s]}$ (mod n), and $w^{\tau[t]}$ (mod l) are computed in parallel, wherein an elliptic curve computing circuit computes the scalar multiplication $[c](\cdot)$ on the elliptic curve, the point addition $+_e$ on the elliptic curve, and the point subtraction $-_e$ on the elliptic curve;

wherein one or a plurality of RSA computing circuits compute the modular exponentiation and modular multiplication operations;

wherein a hash computing circuit computes the hash operations; and wherein a single bus transfers computational results among the elliptic curve computing circuit, the one or the plurality of RSA computing circuits, and the hash computing circuit.

7. The signature verification apparatus according to claim 6, wherein the one or the plurality of RSA computing circuits include one to five modular exponentiation computing circuits.

8. A signature verification apparatus verifying signatures for a group signature, the group signature being subject to:
a predetermined bit-length $K[n]$;
a predetermined bit-length $K[l]$;
a predetermined bit-length $K[e]$;
a predetermined bit-length $K[e']$;
a bit-length $K[q]$ of a prime number q denoting the order of a finite group GG defined by an elliptic curve;
an output bit-length $K[c]$ returned by a hash function Hash applied to a bit sequence of arbitrary length;
a bit-length $K[S]$ such that when a random number r of bit-length $|a|+K[S]$ for any integer a is selected, then a+r and a are statistically indistinguishable;
security parameters $K=(K[n], K[l], K[e], K[e'], K[q], K[c], K[S])$;
an integer $\lambda = K[n]+K[q]+K[S]$;
a set of integer values $\Lambda$ in a range from 0 (inclusive) to $2^\lambda$ (exclusive);
scalar multiplication $[c](\cdot)$ on the elliptic curve, curve;
point addition $+_e$ on the elliptic curve, curve; and
point subtraction $-_e$ on the elliptic curve,
wherein an Issuer's key pair for the group signature comprises:
ipk=(n, a[0], a[1], a[2]);
isk=(p[1], p[2]);
where p[1] and p[2] are safe prime numbers of bit-length $K[n]/2$;
n=p[1]p[2]; and
a[0], a[1], and a[2] are elements of a cyclic subgroup QR(n) with respect to n,
wherein an Opener's key pair for the group signature comprises:
opk=(q, G, H[1], H[2]);
osk=(y[1], y[2]); and
where y[1] and y[2] are elements of the prime number q-modulo finite field Zq, G comprises an element of the finite group GG, H[1]=[y[1]]G, and H[2]=[y[2]]G,
wherein a User-Revocation manager's key pair for the group signature comprises:
rpk=(l, b, w);
rsk=(l[1], l[2]);
where l[1] and l[2] are safe prime numbers of bit-length $K[l]/2$;
l=l[1]l[2]; and
b and w are elements of the cyclic subgroup QR(l) with respect to l,
wherein an i-th User's key pair for the group signature comprises:
msk[i]=x[i];
mpk[i]=(h[i], A[i], B[i]);
where x[i] comprises an element of the set $\Lambda$; and
A[i], B[i], e'[i], and h[i] satisfy h[i]=[x[i]]G, $B[i]=b^{1/e'[i]}$ (mod l), $e[i]=2^{K[e]+e'[i]}$, and $a[0]a[1]^{x[i]} \equiv A[i]^{e[i]}$ (mod n),
wherein the signature verification apparatus verifies a signature $\sigma=(E, A[COM], B[COM], c, \tau[x], \tau[s], \tau[t], \tau[e], \tau[E])$ attached to a message m (where E=E[0], E[1], E[2]), the signature verification apparatus comprising:
means for computing V'[ComCipher]=$([\tau[E]]G -_e [c]E[0], [\tau[x]]G +_e [\tau[E]]H[1], [\tau[x]]G +_e [\tau[E]]H[2] -_e [c]E[2])$;
means for computing $p=c \cdot 2^{K[2]+\tau[e']}$, V'[ComMPK]=$a[0]^c a[1]^{\tau[x]} a[2]^{\tau[s]} A[COM]^{-p}$ (mod n), and V'[ComREV]=$b^c w^{\tau[t]} B[COM]^{-\tau[e']}$ (mod l);
means for computing c'=Hash(K, ipk, opk, rpk, E, A[COM], B[COM], V'[ComCipher], V'[ComMPK], V'[ComREV], m); and
means for returning verification success when all of $|\tau[x]| \leq \lambda + K[c]+K[S]$, $|\tau[e']| \leq K[e']+K[c]+K[S]$, and c'=c hold, and returning verification failure otherwise,
wherein, among the above computations, any two or three of $a[1]^{\tau[x]}$ (mod n), $a[2]^{\tau[s]}$ (mod n), and $w^{\tau[t]}$ (mod l) are computed in parallel,
wherein an elliptic curve computing circuit computes the scalar multiplication $[c](\cdot)$ on the elliptic curve, the point addition $+_e$ on the elliptic curve, and the point subtraction $-_e$ on the elliptic curve,
wherein one or a plurality of RSA computing circuits compute the modular exponentiation and modular multiplication operations,
wherein a hash computing circuit computes the hash operations, and
wherein a single bus transfers computational results among the elliptic curve computing circuit, the one or the plurality of RSA computing circuits, and the hash computing circuit.

\* \* \* \* \*